(12) United States Patent
Watkinson

(10) Patent No.: US 12,012,350 B2
(45) Date of Patent: Jun. 18, 2024

(54) SYSTEM AND METHOD FOR MELTING GLASS OR CERAMIC MATERIALS

(71) Applicant: Glassflake LTD, Leeds (GB)

(72) Inventor: Charles Watkinson, Leeds (GB)

(73) Assignee: Glassflake LTD, Leeds (GB)

( * ) Notice: Subject to any disclaimer, the term of this patent is extended or adjusted under 35 U.S.C. 154(b) by 227 days.

(21) Appl. No.: 17/603,880

(22) PCT Filed: Apr. 7, 2020

(86) PCT No.: PCT/GB2020/050905
§ 371 (c)(1),
(2) Date: Oct. 14, 2021

(87) PCT Pub. No.: WO2020/212688
PCT Pub. Date: Oct. 22, 2020

(65) Prior Publication Data
US 2022/0242771 A1    Aug. 4, 2022

(30) Foreign Application Priority Data

Apr. 15, 2019 (GB) ...................... 1905288

(51) Int. Cl.
*C03B 5/033* (2006.01)
*C03B 5/03* (2006.01)
*H05B 3/03* (2006.01)

(52) U.S. Cl.
CPC .............. *C03B 5/0332* (2013.01); *C03B 5/03* (2013.01); *H05B 3/03* (2013.01); *H05B 2203/025* (2013.01)

(58) Field of Classification Search
CPC ......... F27D 99/0006; F27D 2099/0008; F27B 3/20; F27B 3/28; C03B 5/025;
(Continued)

(56) References Cited

U.S. PATENT DOCUMENTS 3,134,828 A    5/1964 Labino
3,937,625 A    2/1976 Stewart
(Continued)

FOREIGN PATENT DOCUMENTS

CN    202926296 U  *  5/2013
CN    102503097       6/2021
(Continued)

OTHER PUBLICATIONS

International Search Report and Written Opinion from Application No. PCT/GB2020/050905 dated Jun. 25, 2020.
(Continued)

*Primary Examiner* — Hung D Nguyen
(74) *Attorney, Agent, or Firm* — Bell & Manning, LLC

(57) ABSTRACT

A system for melting materials during the production of a glass or ceramic material is disclosed. A method for melting materials during the production of a glass or ceramic material is also disclosed. The system comprises a melt tank having an interior with a width and a length; and an electrode array comprising a plurality of elongate electrodes each extending at least partially across the width of the interior of the melt tank. Each electrode within the electrode array is spaced apart from an adjacent electrode within the electrode array by from about 5 mm to 100 mm. The electrode array is configured such that during a heating operation, current flows between adjacent electrodes within the electrode array, such that heat is radiated from the electrodes to materials located within the interior of the melt tank.

17 Claims, 4 Drawing Sheets

(58) Field of Classification Search
CPC ......... C03B 5/027; C03B 5/0275; C03B 5/03; C03B 5/031; C03B 5/033; C03B 5/0332; C03B 5/0336; C03B 5/235; C03B 35/653; H05B 3/0004; H05B 3/0023; H05B 3/03; H05B 2203/025
See application file for complete search history.

(56) References Cited

U.S. PATENT DOCUMENTS

| | | | |
|---|---|---|---|
| 3,961,126 A * | 6/1976 | Maddux | H05B 3/0023 373/40 |
| 3,967,046 A | 6/1976 | Froberg et al. | |
| 4,528,013 A * | 7/1985 | Dunn | C03B 7/094 65/499 |
| 4,630,280 A * | 12/1986 | Gunthner | H05B 3/03 373/41 |
| 4,672,627 A | 6/1987 | Dunn | |
| 5,651,827 A | 7/1997 | Aoyama et al. | |
| 2001/0029006 A1 | 10/2001 | Tomita et al. | |
| 2007/0197366 A1 | 8/2007 | Aoki et al. | |
| 2015/0325836 A1 | 11/2015 | Neumann et al. | |
| 2016/0347644 A1 | 12/2016 | Dabich II et al. | |

FOREIGN PATENT DOCUMENTS

| | | |
|---|---|---|
| DE | 102009007283 A | 8/2010 |
| EP | 0325055 A2 | 7/1989 |
| GB | 674990 A | 7/1952 |
| GB | 1029197 | 5/1966 |
| GB | 1029197 A | 5/1966 |
| GB | 1311352 | 3/1973 |
| GB | 2031402 A | 4/1980 |
| JP | 55109245 A | 8/1980 |
| JP | 55158135 | 12/1980 |
| JP | S57-205327 | 12/1982 |
| JP | S61-006132 | 1/1986 |
| JP | H01-167237 | 6/1989 |
| JP | S55-056030 | 9/2010 |
| RU | 2465221 C2 | 10/2012 |
| RU | 2603115 C1 | 11/2016 |
| WO | 2011/077068 A1 | 6/2011 |

OTHER PUBLICATIONS

Search and Examination Report from Application No. GB1905288.5 dated Sep. 27, 2019.
Search Report and Office Action from Russian Application No. 2021129477/03(062535) dated Aug. 24, 2023.
Irretier, et al., "High-Speed Infrared Furnace for Glass with Operating Temperagues up to 900° C.," Elektrowame International, Mar. 1999 (pp. 20-22).
Tanaka, "Far Infra-Red Heating and its Appliances for Ceramics," The British Library Science Reference Library Bayswater Division, Nov. 6, 1973, pp. 98-104.

* cited by examiner

102

102

102

SYSTEM AND METHOD FOR MELTING GLASS OR CERAMIC MATERIALS

CROSS-REFERENCE TO RELATED APPLICATIONS

This application is a § 371 national stage of International Application PCT/GB2020/050905, with an international filing date of 7 Apr. 2020, which International Application claims the benefit of GB 1905288.5, filed on 15 Apr. 2019, the benefit of the earlier filing date of which is hereby claimed under 35 USC § 119(a)-(d) and (f). The entire contents and substance of all applications are hereby incorporated by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

This invention relates generally to a system and method for melting materials. More specifically, although not exclusively, this invention relates to a system and method for melting materials during the production of a glass or ceramic material.

2. Description of Related Art

Conventional electrical melting of glass (or similarly some ceramic materials) uses the method of direct electrical resistance, where electrodes, usually molybdenum, are placed into molten glass and a current is passed between them. The electrical resistivity of the glass is higher than that in the electrical circuit causing the glass to heat between the electrodes. Glass Batch comprised of various minerals but predominantly silica sand is fed on top of the molten glass and is heated until it melts, forming new glass.

Melting glass in this way is clean and relatively efficient compared with, for instance, gas melting. However, this method is still inefficient due to the heat losses. That is, the zone heated between the electrodes is relatively thin/shallow and relies upon conduction (and to a much lesser extent convection) to heat the glass batch above it. Glass is a poor conductor of heat and therefore melting glass in this way requires a shallow melt tank with a large surface area to obtain the quantity of glass required for a production process. Due to this the heat losses are large.

It is desirable to provide an improved system for melting materials that mitigates the above problems.

BRIEF SUMMARY OF THE INVENTION

Accordingly, a first aspect of the invention provides a system for melting materials during the production of a glass or ceramic material, the system comprising:
  a melt tank having an interior with a width and a length; and
  an electrode array comprising a plurality of elongate electrodes each extending at least partially across the width of the interior of the melt tank in a direction substantially perpendicular to the length of the interior of the melt tank;
  wherein each electrode within the electrode array is spaced apart from an adjacent electrode within the electrode array by from about 5 mm to 100 mm;
  wherein the electrode array is configured such that during a heating operation, current flows between adjacent electrodes within the electrode array, such that heat is radiated from the electrodes to materials located within the interior of the melt tank.

Aptly, the plurality of electrodes are substantially coplanar.

Aptly, each electrode within the electrode array is spaced from an adjacent electrode within the electrode array by from about 5 mm to 30 mm along the length of the interior of the melt tank.

Aptly, each electrode within the electrode array is spaced from an adjacent electrode within the electrode array by from about 7 mm to 25 mm along the length of the interior of the melt tank.

Aptly, each electrode of the plurality of electrodes is a strip electrode.

Aptly, an upper surface of each electrode is rounded.

Aptly, each electrode extends at least partially across the width of the interior of the melt tank in a position proximate a base of the melt tank.

Aptly, the electrode array comprises a first set of electrodes and a second set of electrodes, wherein during a heating operation, current flows between electrodes of the first set of electrodes and electrodes of the second set of electrodes.

Aptly, the electrodes of the first set of electrodes are coupled to a first side of the melt tank and the electrodes of the second set of electrodes are coupled to a second side of the melt tank.

Aptly, the first and second sides are opposing sides of the melt tank.

Aptly, the electrodes of the first set of elongate electrodes are arranged in an alternating manner with the electrodes of the second set of elongate electrodes.

Aptly, the system comprises a control system for controlling the potential difference between the first set of electrodes and the second set of electrodes.

Aptly, the control system is configured such that the potential difference between each of the first set of elongate electrodes and an adjacent electrode of the second set of elongate electrodes is from about 10V to 40V.

Aptly, the system comprises at least two electrode arrays.

Aptly, each of the at least two electrode arrays is spaced from an adjacent electrode array along the length of the interior of the melt tank.

Aptly, each of the at least two electrode arrays is spaced from an adjacent electrode array along the length of the interior of the melt tank by from about 50 mm to 300 mm.

Aptly, the control system is configured to control the potential difference between the first set of electrodes and the second set of electrodes of each electrode array independently.

Accordingly, a second aspect of the invention provides a system for melting materials during the production of a glass or ceramic material, the system comprising:
   a melt tank having an interior with a width and a length; and
   an electrode array comprising a plurality of elongate electrodes each extending at least partially across the width of the interior of the melt tank in a direction substantially perpendicular to the length of the interior of the melt tank;
   wherein the density of electrodes within the electrode array is from about 2 to 20 electrodes per 200 mm along the length of the interior of the melt tank;
   wherein the electrode array is configured such that during a heating operation, current flows between adjacent electrodes within the electrode array, such that heat is radiated from the electrodes to materials located within the interior of the melt tank.

Accordingly, a third aspect of the invention provides a system for melting materials during the production of a glass or ceramic material, the system comprising:
   a melt tank having an interior with a width and a length; and
   an electrode array comprising a plurality of elongate strip or flat bar electrodes each extending at least partially across the width of the interior of the melt tank in a direction substantially perpendicular to the length of the interior of the melt tank;
   wherein the electrode array is configured such that during a heating operation, current flows between adjacent electrodes within the electrode array, such that heat is radiated from the electrodes to materials located within the interior of the melt tank.

Aptly, an upper surface of each electrode is rounded.

Aptly, the system of the second and third aspects have corresponding features to the first aspect of the invention.

Accordingly, a fourth aspect of the invention provides a use of the system of the first or second aspect for melting materials during the production of a glass or ceramic material.

Accordingly, a fifth aspect of the invention provides a method for melting materials during the production of a glass or ceramic material, the method comprising:
   providing a system comprising;
      a melt tank having an interior with a width and a length; and
      an electrode array comprising a plurality of elongate electrodes each extending at least partially across the width of the interior of the melt tank in a direction substantially perpendicular to the length of the interior of the melt tank;
      wherein each electrode within the electrode array is spaced apart from an adjacent electrode within the electrode array by from about 5 mm to 100 mm;
   performing a heating operation comprising flowing current between adjacent electrodes within the electrode array to thereby radiate heat from the electrodes to materials located within the interior of the melt tank.

Aptly, the system in the fifth aspect is that of the first, second or third aspect.

Certain embodiments of the invention provide the advantage that an improved system for melting materials during the production of a glass or ceramic material is provided.

Certain embodiments of the invention provide the advantage that the system can melt materials, during the production of a glass or ceramic material, more efficiently than known systems utilising direct electrical resistance. In particular, the system has reduced heat losses compared to known systems.

Certain embodiments of the invention provide the advantage that the system is less reliant on the conduction and/or convection of heat in comparison to known systems utilising direct electrical resistance.

Certain embodiments of the invention provide the advantage that the system can utilise a smaller melt tank to achieve the quantities of molten glass or ceramic required for a continuous production process, in comparison to known systems.

Certain embodiments of the invention provide the advantage that an improved method for melting materials during the production of a glass or ceramic material is provided.

Certain embodiments of the invention provide the advantage that the method is more energy efficient than known methods.

For the avoidance of doubt, any of the features described herein apply equally to any aspect of the invention. Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one aspect or embodiment of the invention are applicable to all aspects or embodiments, unless such features are incompatible.

BRIEF DESCRIPTION OF THE DRAWINGS

Embodiments of the invention will now be described by way of example only with reference to the accompanying drawings in which.

DETAILED DESCRIPTION OF THE INVENTION

Figure 1:
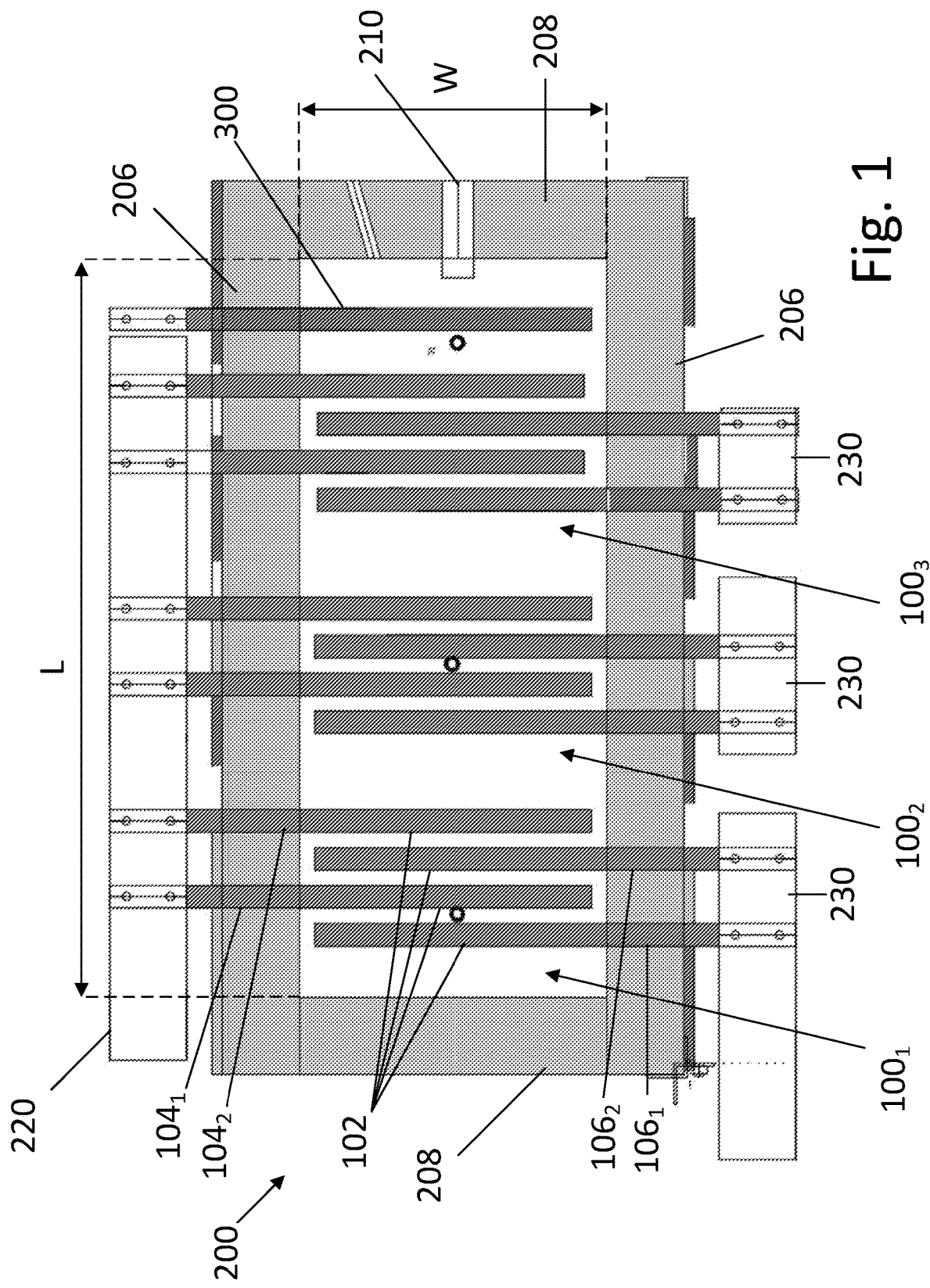
FIG. 1 illustrates a cut-away plan view of a system including a melt tank.
Figure 2:
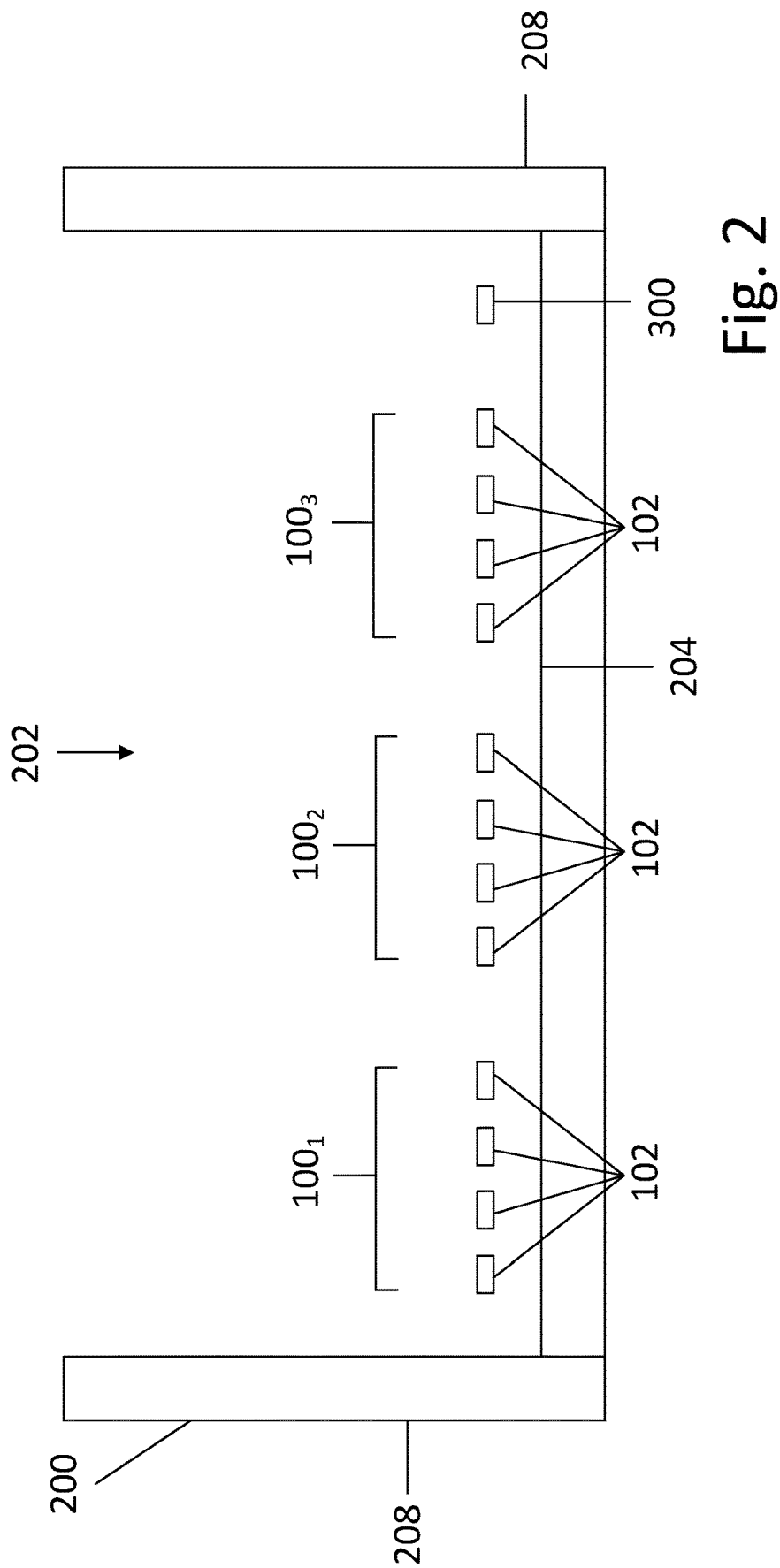
FIG. 2 illustrates a cut-away side view of the system of FIG. 1.

Referring now to FIGS. 1 and 2, a system is illustrated for melting material during the production of a glass or ceramic material. The system includes a melt tank 200. The melt tank 200 may be any known melt tank. For example, the melt tank 200 may include a structure of zircon refractory bricks lined with silimonite insulation blocks as is known in the art.

The melt tank has an interior 202. The interior 202 is configured to receive the materials to be melted. For example, the interior 202 may receive glass 'batch' (a mix of constituent components of a glass) or glass pellets. The materials to be melted may be received within the interior 202 of the melt tank 200 in any suitable manner. For example, the material may be fed from a hopper, or similar, into the interior 202 of the melt tank 200 from above the melt tank. The materials may be fed in continuously or in one or more discrete amounts depending on the production use of the melt tank 200.

The interior 202 has a width, W, and a length, L. In this example, the melt tank 200 is rectangular in profile and therefore the width and length are perpendicular. The melt tank 200 has two longer sides 206, defining the length L of the interior 202 of the tank and two shorter sides 208 defining the width, W, of the interior 202 tank (the width of the tank being shorter than the length of the tank). An outlet 210 is typically located in a side 208, defining the width of the tank. In other examples, the outlet may be located elsewhere (e.g. in a side 206 defining the length of the tank).

The interior 202 has a base 204 (i.e. internal base). Although not shown in the Figures, the base 204 is sloped downwardly towards the outlet 210 to aid the flow of the molten product towards the outlet 210 (i.e. the base is sloped along the length of the tank). However, in other examples the base 204 may extend horizontally (i.e. without a slope). The interior 202 is enclosed by the sides 206,208 of the tank.

The system includes an electrode array $100_1$. The electrode array $100_1$ includes a plurality of elongate electrodes 102 each extending at least partially across the width, W, of the interior of the melt tank in a direction substantially perpendicular to the length, L, of the interior of the melt tank 200. In this example, the electrode array $100_1$ includes four electrodes 102, although other examples may include more or less electrodes, for example 3, 5, 6 or more electrodes.

The electrodes 102 may be made from any suitable material, for example molybdenum, platinum, iridium or another metal with a relatively high melting point metal.

As used herein, the term "elongate" within the term "elongate electrode" indicates that a dimension of the electrode (for example, the length of the electrode) is elongated with respect to another dimension of the electrode (for example, the width or thickness of the electrode). In the described examples, the elongated dimension is the length of the elongate electrode extending across the width of the interior of the melt tank.

As used herein, the term "substantially perpendicular" with regards to the extension of the electrodes with respect to the length, L, of the interior of the melt tank 200, generally refers to the extension of the electrodes 102 across the width of the interior of the melt tank in a direction perpendicular to the length, L, of the interior of the melt tank 200. That is, the electrodes are perpendicular to the side walls 206 of the melt tank. However, it would be understood that minor or trivial deviations from perpendicular are encompassed by this term.

In this example, the electrodes 102 of the electrode array $100_1$ are parallel and substantially co-planar. In other words, the elongate (or longitudinal) axis of each electrode 102 within the electrode array $100_1$ is located within a common plane and is parallel to the longitudinal axis of adjacent electrodes. In this example, the electrodes 102 are arranged along the length of the interior of the melt tank. That is, the common plane of the electrodes 102 within the electrode array $100_1$ is substantially horizontal and/or parallel to the base 204 of the melt tank 200.

In this example, the electrodes are straight. In other words, the electrodes extend at least partially across the width of the interior of the melt tank 200 along a linear path.

In this example, the electrode array $100_1$ includes a first set of electrodes $104_{1-2}$ and a second set of electrodes $106_{1-2}$. In this example the electrodes of the first set of electrodes $104_{1-2}$ are arranged in an alternating manner with the electrodes of the second set of electrodes $106_{1-2}$. In other words, along the length of the interior 202 of the melt tank 200, the electrodes 102 within the electrode array $100_1$ alternate between being an electrode of the first set of electrodes $104_{1-2}$ and an electrode of the second set of electrodes $106_{1-2}$. In the illustrated example, the electrodes of the first set of electrodes are coupled to (i.e. extend from) a first side of the melt tank and the electrodes of the second set of electrodes are coupled to a second, opposing, side of the melt tank.

As illustrated in FIG. 2, in this example each electrode 102 of the electrode array $100_1$ extends at least partially across the width of the interior 202 of the melt tank 200 in a position proximate (i.e. close to or adjacent to) the base 204 of the melt tank. For example, the electrodes 102 may be located from substantially 10 mm to 100 mm from the base of the tank. The molten glass is intended to flow down through the electrode array(s), with the drain being lower than the electrode array(s) within the tank 200. To avoid overheating at the base 204 of the tank 200 there is generally an optimum position for location of the electrodes 102. For example, the optimum position may be from 50 mm to 70 mm from the base 204 of the tank 200, more aptly about 60 mm from the base of the tank.

The electrode array $100_1$ is configured such that during a heating operation, current flows between adjacent electrodes 102 within the electrode array $100_1$. In this example, current is made to flow between adjacent electrodes 102 upon application of a potential difference between the first set of electrodes and the second set of electrodes. As used herein, 'adjacent electrodes' are those that are directly adjacent within the electrode array $100_1$ (in other words the next or proximal electrode within the array).

The flow of current between adjacent electrodes 102 within the electrode array $100_1$ will heat materials within the interior 202 of the melt tank 200 (for example molten glass) by direct electrical resistance heating. As current flows between adjacent electrodes 102 within the electrode array $100_1$, heat is also radiated from the electrodes 102 to materials located within the interior of the melt tank 200. That is, as current flows between adjacent electrodes 102, the electrodes heat up and emit heat in the form of infra-red (IR) radiation. In other words the heating operation includes flowing current between adjacent electrodes within the electrode array to thereby radiate heat from the electrodes to materials located within the interior of the melt tank.

As used herein IR, including near-IR radiation, is defined as electromagnetic radiation having a wavelength of substantially from 700 nm to 1 mm and a frequency of from substantially 300 GHz to 430 THz. Near-IR, in particular, is generally considered to have a wavelength of 700 nm to 2500 nm or more aptly 780 nm to 2500 nm. From herein 'IR' refers to both IR and near IR frequencies.

Each electrode 102 within the electrode array $100_1$ is spaced apart from an adjacent electrode within the electrode array by from about 5 mm to 100 mm. The spacing between adjacent electrodes within the electrode array $100_1$ is along the length of the interior of the melt tank (in other words the electrodes are spaced apart substantially horizontally). Aptly, each electrode 102 within the electrode array $100_1$ is spaced apart from an adjacent electrode within the electrode array by from about 5 mm to 30 mm. As used herein, the 'spacing' between adjacent electrodes refers to the separation or gap between adjacent electrodes.

In other words, the density of electrodes 102 within the electrode array $100_1$ is from about 2 to 20 electrodes per 200 mm (or in other words 2 electrodes per 20 mm to 2 electrodes per 200 mm) along the length of the interior 202 of the melt tank 200.

As used herein, the density of electrodes within the electrode array is calculated between the elongate/longitudinal axes (i.e. the centre-points) of the end electrodes within the electrode array. For example, in this example, the electrode array $100_1$ has 4 electrodes of width 20 mm, with a spacing of 15 mm between adjacent electrodes. The distance between the elongate axes of the end electrodes 102 within the array is 105 mm. The density of electrodes is therefore 4 electrodes per 105 mm (or 7.6 electrodes per 200 mm).

In another example, the electrode array $100_1$ may have 4 electrodes of width 10 mm, with a spacing of 5 mm between adjacent electrodes. In this case, the distance between the elongate axes of the end electrodes within the array is 45 mm, such that the density of electrodes is 4 electrodes per 45 mm (or approximately 18 electrodes per 200 mm).

In another example, the electrode array $100_1$ may have 4 electrodes of width 30 mm, with a spacing of 100 mm between adjacent electrodes. In this case, the distance between the elongate axes of the end electrodes within the array is 390 mm, such that the density of electrodes is 4 electrodes per 390 mm (or 2 electrodes per 195 mm).

The close spacing between electrodes 102 in the electrode array $100_1$ (i.e. the high density of electrodes within the electrode array $100_1$) increases the amount of radiated heat from the electrodes. That is, the increased number of electrodes within a small area provides a larger electrode surface area which results in increased IR output. In this manner, although direct electrical resistance is used as a means of generating the IR, the primary mechanism for heating the materials within the melt tank is by radiation rather than direct electrical resistance, as with known systems.

The use of IR as a primary heating mechanism provides benefits over direct electrical resistance systems. IR may pass easily through materials in the melt tank (for example molten glass near the base of the tank interior) and impact directly upon the non-molten materials (for example glass batch or glass pellet) yet to be melted. The heating of materials within the tank is therefore less reliant on the conduction/convection of heat through the materials themselves. As such, tanks with a smaller surface area can be used and hence heat losses are reduced. In other words, the use of IR as a primary heating mechanism allows the product to be melted quickly in a melt tank a fraction of the size of that used in the more conventional direct electrical resistance method. In addition, providing electrodes which are spaced closer together allows a lower voltage to be used compared to known systems, which helps reduce the power consumption of the system for a given heating effect.

Providing a spacing below the range specified above can reduce the required voltage to the extent that controllability of the system becomes difficult and thicker water cooled transformer wires are required. Providing a spacing above the range specified above can reduce the conduction between the electrodes to the extent that the lower voltage must be increased to compensate, effectively reverting to the more conventional direct electrical resistance melting. A spacing of from about 7 mm to 25 mm, more aptly 15 mm has been found to be particularly advantageous for the reasons outlined above.

It should be noted that with previously known direct electrical resistance systems, where the primary mechanism of heating is by the passage of current through the product itself, the heating of product within the melt tank is more effective when the electrodes are spaced further apart (for example from about 500 mm to about 1 m apart). Moreover, electrodes are generally large (for example about 60 mm in diameter) and expensive, such that as few electrodes are used as possible.

In this example, each electrode of the plurality of electrodes 102 is a strip electrode (or in other words a bar electrode or a flat bar electrode). As used herein, the term "strip" within the term "strip electrode" refers to a geometry in which the electrode has two surfaces separated through the thickness of the strip. Each surface has dimensions (for example, the surface having a length, corresponding to the elongated length of the electrode, and a width) that are relatively large in comparison to the thickness of the strip. For example, the width of each electrode 102 may be at least 40% larger than the thickness of the strip.

With regards to the strips described herein, the 'surfaces' are heating surfaces, configured to radiate heat therefrom. In this example, the electrodes 102 are arranged such that the heating surfaces are upper and lower heating surfaces. In other words, the electrodes are oriented such that one of the heating surfaces faces upwardly in the tank (in other words the thickness of the electrodes is arranged substantially perpendicular to the base of the melt tank and the width of the electrodes is arranged substantially horizontally and/or parallel to the base of the tank interior). In this manner, the radiated heat from the upper surface is directed towards the non-molten product above.

The use of elongate strips as electrodes provides a large external surface area relative to the cross-sectional area of the electrodes. The amount of heat radiated from an electrode upon passage of a current therethrough (due to Joule heating) is generally proportional to the resistance of the electrode. The resistance of an electrode is inversely proportional to its cross-sectional area (for a given electrode length). For a given electrode surface area, a strip has a lower cross-sectional area, and therefore higher resistance, than other shapes (for example rod electrodes of circular cross-section, which are used in typical direct electrical resistance systems due to their strength). In this way, an elongate strip electrode helps the electrode radiate heat efficiently (i.e. a lower current is required for the same heat output at a given potential difference).

Figure 3A:
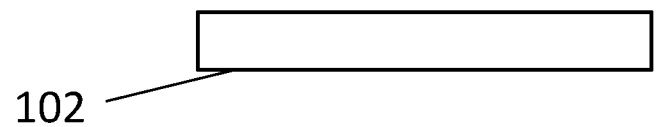
FIGS. 3a, 3b and 3c illustrate cross-sections of examples of electrodes for use in the system of FIG. 1.
Figure 3B:
Figure 3C:

The strip electrodes 102 may have any suitable cross-section, for example substantially rectangular, substantially semi-circular, a combination thereof or the like. FIG. 3a illustrates the cross-section taken across the elongate axis of an example electrode 102. In this example, the cross-section of the electrode is substantially rectangular. In other examples, the upper surface of each electrode 102 is rounded. That is, the upper surface is not flat (i.e. not linear). In other words, the upper surface traverses a non-linear path between the sides of the electrode. FIGS. 3b and 3c illustrate a cross-section taken across the elongate axis of an example electrode 102, where the upper surface of the electrode is rounded.

Rounding the upper surface increases the surface area of the upper surface. The surface area available for IR emission/output upward to the unmelted batch or pellets is therefore increased. The upper surface may be rounded by any suitable amount. For example, the upper surface may traverse a path that is a slight deviation from a linear path between the sides of the electrode (as shown in the examples of FIG. 3b and FIG. 3c). That is, the rounded upper surface may not be curved to the extent of being semi-circular (where the diameter of the semi-circular upper surface corresponds to the width of the electrode). For example the rounded surface may have a radius of curvature of about 40 to 60 mm, aptly 50 mm. In this manner, the electrode benefits from an increased upper surface area for increased IR emissions, without significantly increasing the cross-sectional area of the electrode (and hence lowering the efficiency of the electrode).

For examples with a rounded upper surface, the lower surface may be non-rounded (i.e. generally flat or linear) such that IR output downward, into the already molten product, is lower than that into the unmelted batch or pellets above.

The width of the electrodes may be from about 10 mm to 30 mm, aptly the width of the electrode is about 20 mm. The thickness of the electrode may be from about 5 mm to 20 mm, aptly the thickness of the electrode is about 12 mm.

In this example, the electrodes 102, within the electrode array $100_1$ only extend partially across the width of the interior 202 of the melt tank 200. An end of each of the electrodes of the first and second sets of elongate electrodes is spaced from a wall of the melt tank by a distance of from about 5 mm to 30 mm. Providing a gap between an end of each electrode and the wall of the melt tank, towards which it extends, helps avoid pulling/pushing on the sidewall by the electrode during start up and shut down of the system. This is particularly important in situations where the system is being stopped and started regularly.

In other examples, the electrodes 102 may extend across the entire width of the interior of the melt tank. For example, the first and second sets of electrodes may extend from opposing sides of the melt tank as described above, but may extend all the way to the opposite side of the melt tank interior. The end of each electrode may be supported by the corresponding wall of the melt tank interior. For example, the end of each electrode may be received within the corresponding wall of the melt tank interior, for example in a groove, hole, ledge or mounted bracket. By supporting the end of each electrode, the electrodes may be less prone to sagging such that deformation is reduced at high temperatures and the lifetime is extended.

In this example, the system includes at least two electrode arrays of the type described above. Specifically, the system includes three electrode arrays $100_1$, $100_2$ and $100_3$. It would be understood that the system may have any number of electrode arrays according to a number of factors (for example, the size of the tank interior and/or the required heat output, which may itself depend on the materials to be melted, the required output of melted product, for example).

Figure 4:
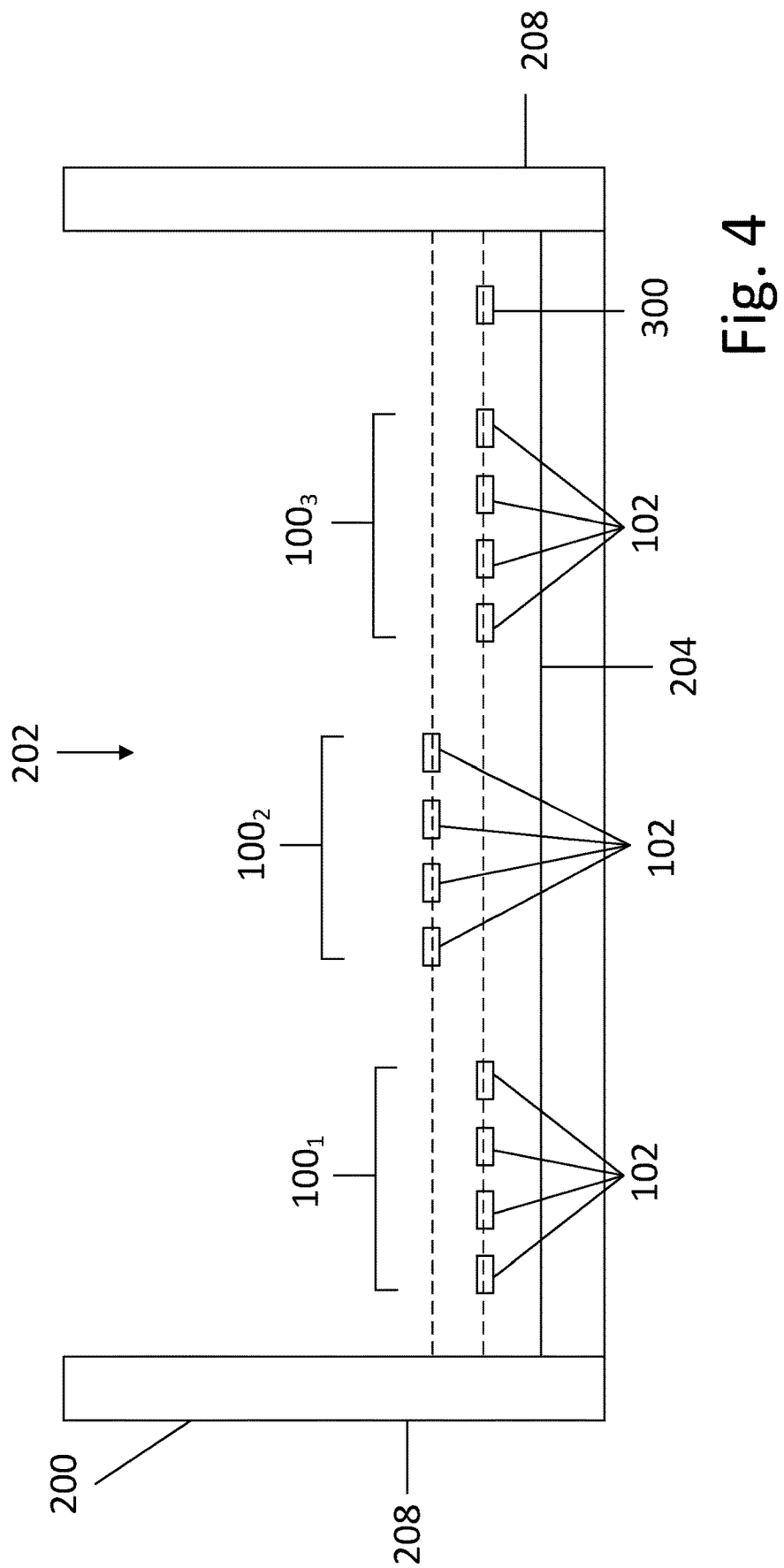
FIG. 4 illustrates a cut-away plan view of another system including a melt tank.

In the illustrated example, the electrode arrays $100_{1-3}$ are co-planar. That is, the planes of each electrode array $100_{1-3}$ are coincident. However, in alternative embodiments such as that shown in FIG. 4, the electrode arrays $100_{1-3}$ may be arranged in other ways. For example, at least one of the electrode arrays may be positioned in a plane offset from the other electrode arrays (for example, there may be three electrode arrays, with one parallel with but offset vertically from the other two). By offsetting adjacent electrode arrays vertically the lateral spacing between electrodes arrays can be decreased without interference between the adjacent arrays.

In this example, each of the electrode arrays $100_{1-3}$ is spaced from an adjacent electrode array. In particular, the electrode arrays $100_{1-3}$ are spaced along the length of the interior of the melt tank. Spacing the electrode arrays $100_{1-3}$ allows the electrode arrays to be controlled independently more easily (as described below). In other words, separating the electrode arrays prevents the passage of interference currents between electrodes of adjacent arrays, such that they can be more easily independently controlled. In addition, the separation of electrode arrays helps prevent 'hotspots' within the interior of the melt tank during a heating operation. As described herein a 'hot spot' is a region in which the glass is significantly hotter than the surrounding material. This causes the conductivity in this area to increase resulting in higher current flows therethrough compared to surrounding regions. The higher current flows further heat the glass, such that the local increase in temperature can become self-propagating.

The electrode arrays may be spaced from an adjacent electrode array by from about 50 mm to 300 mm, aptly from about 60 mm to 150 mm, more aptly 75 mm.

As referred to previously, the above described configurations allow a tank with a reduced surface area compared to known systems to be used to provide molten product within a continuous production process. For example, the interior of the melt tank may have a width of from 400 mm to 600 mm. The interior of the melt tank may have a length of 700 mm or more. That is, the above described concept may be scaled up by increasing the length of the melt tank to any required value.

In this example the system includes a control system for controlling the flow of current within each electrode array $100_{1-3}$. In this example, the control system controls the potential difference between the first set of electrodes and the second set of electrodes to affect the flow of current.

The electrode arrays $100_{1-3}$ may be coupled to the control system in any suitable manner. For example, a cable may connect each of the first and second sets of the electrode array (or each electrode therein) to the control system. The cable may be bolted to the corresponding set or electrode. The cable may be water-cooled.

In this example, the first and second sets of electrodes of each electrode array $100_{1-3}$ are electrically connected within separately controlled circuits. That is, each electrode array $100_{1-3}$ includes a first set of electrodes $104_{1-2}$ and a second set of electrodes $106_{1-2}$, connected into a circuit. In the illustrated example, each set of electrodes is electrically coupled to a corresponding busbar 220, 230. In this example, a common busbar 220 is used as the first busbar of the first set of electrodes of each electrode array $100_{1-3}$. However, a separate busbar 230 is used as the second busbar of the second set of electrodes of each electrode array $100_{1-3}$ to ensure that each electrode array $100_{1-3}$ is present on a separate circuit and can hence be controlled independently. Each circuit includes a transformer, configured to transform the voltage supplied from a power source (or separate power sources for each array) to the required level as determined by the control system. The power source, for example, may be a 415V power source.

The control system may include a user interface, which allows a user to provide instructions to the control system prior to/during operation. In other examples (or in addition), the control system may operate according to pre-programmed instructions.

For example, the system may initially be controlled manually. The manual control may continue until monitored parameters become relatively constant, at which point the control of the control system may be passed to a computer, which operates according to pre-programmed instructions.

In some examples, the electrode arrays are controlled independently. That is, the flow of current between the first and second sets of each electrode array may be controlled and varied independently (in other words the control system can control the potential difference between the first set of electrodes and the second set of electrodes of each electrode array independently). Independent control may be achieved through a single control system, which can operate each electrode array independently, or an independent control system for each electrode array. The independent control of the electrode arrays allows the heat output (i.e. the emitted IR radiation) to be varied in the different locations within the tank. For example, the current flow through each electrode array and hence the heat output from each electrode array may correspond to its relative distance from the outlet of the melt tank. For example, the electrode array further from the outlet may have a higher heat output relative to those nearer the outlet, as required. This allows greater control over the temperature gradient of molten product within the melt tank.

For a melt tank and electrode array arrangement as described above, the applied potential difference between the ends of individually controlled electrode arrays is from substantially 10 V to 40 V. Potential differences within this range are generally sufficient to drive a current across the small gap between adjacent electrodes within the electrode array, through the material in the interior of the melt tank. The resulting power consumption for a tank as described above (with three electrode arrays), is typically from 40 kW to 100 kW in producing a continuous stream of molten glass of 1-4 kg/minute.

As with known systems that operate with direct electrical resistance, it may be required that the electrodes be at least partially immersed in molten product during system start-up. For example when the system is used to produce a glass material, it may be required that a layer of molten glass is provided (in some examples including Borax), which encompasses the electrodes to allow a heating operation to begin (i.e. to allow the flow of current between adjacent electrodes due to the improved electrical conductivity of glass when molten). Molten glass sufficient to immerse the electrodes may be provided using a gas heater.

Various modifications to the detailed arrangements as described above are possible. For example, it would be appreciated that although the described examples refer only to the melting of a material to produce a molten glass, the above apparatus may also be used in melting of materials in the production of a ceramic material.

The electrodes within each array may be configured in any suitable manner. For example, electrodes of different dimensions and/or different cross-sections and/or different spacings may be used within a single electrode array. The first and second sets of electrodes within at least one array may all extend from the same side of the interior of the melt tank.

Each electrode array may be configured in any suitable manner. For example, the arrangement (for example the dimensions and/or cross-section and/or spacings) of electrodes and/or the number of number of electrodes in adjacent electrodes arrays may differ according to the required heat output in a particular area of the tank.

In the illustrated example, the system includes a single optional electrode 300 proximate the outlet 210 of the melt tank. This electrode helps provide heating across the full length of the melt tank during start up and additionally allows fine temperature control during operation (where required). The electrode 300 may be configured such that during a heating operation current flows between the electrode 300 and an electrode of the closest electrode array ($100_3$) or the outlet 210 itself. In other examples this electrode 300 may not be present and instead the electrode array $100_3$ may extend to a position proximate the outlet 210.

In some examples, the melt tank may include an additional chamber positioned between the electrodes $100_{1,2,3}$ (and optionally the electrode 300) and the outlet 210. In such examples, the additional chamber is defined by a weir, separating the main volume of the melt tank from the additional chamber. The weir helps prevent passage of semi-molten glass (e.g. unmelted or partially melted particles) from travelling along the bottom of the tank and out of the outlet 210. Further electrodes may be located towards an upper end of the weir to provide additional heating to the glass passing thereover, helping to release any bubbles formed and ensuring it remains molten as it flows towards the outlet. For example a pair of electrodes (which may include electrode 300) may be placed either side of the upper end of the weir.

It will also be appreciated by those skilled in the art that any number of combinations of the aforementioned features and/or those shown in the appended drawings provide clear advantages over the prior art and are therefore within the scope of the invention described herein.

The schematic drawings are not necessarily to scale and are presented for purposes of illustration and not limitation. The drawings depict one or more aspects described in this disclosure. However, it will be understood that other aspects not depicted in the drawings fall within the scope of this disclosure.

The invention claimed is:

1. A system for melting materials during the production of a glass or ceramic material, the system comprising:
a melt tank having an interior with a width and a length; and
an electrode array comprising a plurality of elongate electrodes each having a width extending substantially parallel to the width of the interior of the melt tank, a length extending substantially parallel to the length of the interior of the melt tank and a thickness extending substantially perpendicularly to the width of the interior of the melt tank and extending substantially perpendicularly to the length of the interior of the melt tank;
each electrode within the electrode array extending at least partially across the width of the interior of the melt tank in a direction substantially perpendicular to the length of the interior of the melt tank;
wherein the width of each electrode within the electrode array is at least 40% greater than the thickness of the electrode within the electrode array;
wherein each electrode within the electrode array is spaced apart from an adjacent electrode within the electrode array by from about 5 mm to 100 mm; and
wherein the electrode array is configured such that during a heating operation, current flows between adjacent electrodes within the electrode array, such that heat is radiated from the electrodes to materials located within the interior of the melt tank.

2. The system according to claim 1, wherein the plurality of electrodes are substantially co-planar.

3. The system according to claim 1, wherein each electrode within the electrode array is spaced from an adjacent electrode within the electrode array by from about 5 mm to 30 mm along the length of the interior of the melt tank.

4. The system according to claim 1, wherein each electrode within the electrode array is spaced from an adjacent electrode within the electrode array by from about 7 mm to 25 mm along the length of the interior of the melt tank.

5. The system according to claim 1, wherein an upper surface of each electrode is rounded.

6. The system according to claim 1, wherein each electrode extends at least partially across the width of the interior of the melt tank in a position proximate a base of the melt tank.

7. The system according to claim 1, wherein the electrode array further comprises:
a first set of electrodes; and
a second set of electrodes;
wherein during a heating operation, current flows between electrodes of the first set of electrodes and electrodes of the second set of electrodes.

8. The system according to claim 7, wherein the electrodes of the first set of electrodes are coupled to a first side of the melt tank; and
wherein the electrodes of the second set of electrodes are coupled to a second side of the melt tank.

9. The system according to claim 8, wherein the first and second sides are opposing sides of the melt tank.

10. The system according to claim 7, wherein the electrodes of the first set of elongate electrodes are arranged in an alternating manner with the electrodes of the second set of elongate electrodes.

11. The system according to claim 7 further comprising a control system for controlling the potential difference between the first set of electrodes and the second set of electrodes.

12. The system according to claim 11, wherein the control system is configured such that the potential difference between each of the first set of elongate electrodes and an adjacent electrode of the second set of elongate electrodes is from about 10V to 40V.

13. The system according to claim 1 further comprising at least one additional electrode array.

14. The system according to claim 13, wherein each of the at least two electrode arrays is spaced from an adjacent electrode array along the length of the interior of the melt tank.

15. The system according to claim 13, wherein each of the at least two electrode arrays is spaced from an adjacent electrode array along the length of the interior of the melt tank by from about 50 mm to 300 mm.

16. The system according to claim 13, wherein each of the at least two electrode arrays further comprise:
a first set of electrodes;
a second set of electrodes; and
a control system
wherein during a heating operation, current flows between electrodes of the first set of electrodes and electrodes of the second set of electrodes; and
wherein the control system is configured to control the potential difference between the first set of electrodes and the second set of electrodes of each electrode array independently.

17. A method for melting materials during the production of a glass or ceramic material, the method comprising:
providing the system according to claim 1; and
performing a heating operation comprising flowing current between adjacent electrodes within the electrode array to thereby radiate heat from the electrodes to materials located within the interior of the melt tank.

* * * * *